Sept. 28, 1926.
E. G. SIMPSON
WINDOW WELL SEALING SASH
Filed July 6, 1925
1,601,000
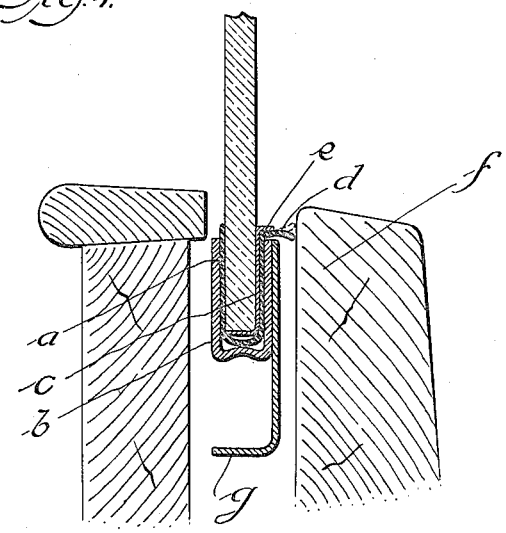
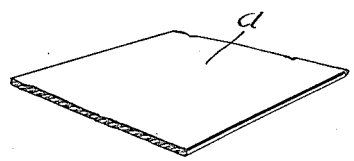
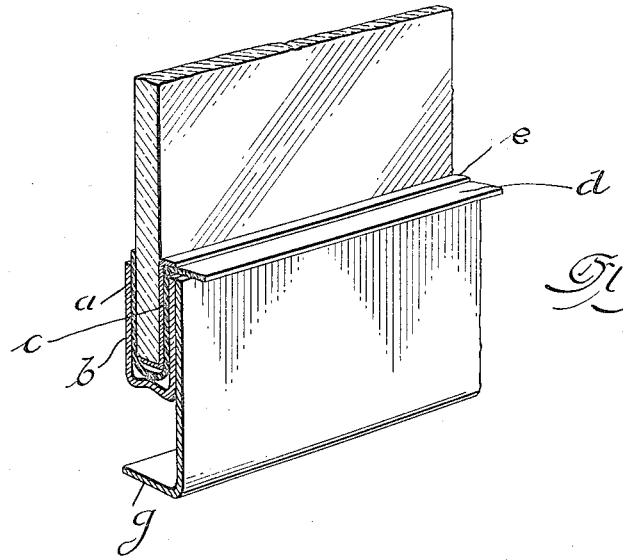
INVENTOR:
Emory Henn Simpson
BY
Stuart C. Barnes
ATTORNEY.

Patented Sept. 28, 1926.

1,601,000

UNITED STATES PATENT OFFICE.

EMORY GLENN SIMPSON, OF DETROIT, MICHIGAN, ASSIGNOR TO FISHER BODY CORPORATION, OF DETROIT, MICHIGAN, A CORPORATION OF NEW YORK.

WINDOW WELL SEALING SASH.

Application filed July 6, 1925. Serial No. 41,699.

This invention relates to weather sealing strips for window wells, especially window wells used in coach work on automobile bodies.

It is the object of the present invention to provide a combined glass, cushion and weather seal of minimum simplicity so as to somewhat lessen the cost of weather seals for window wells.

In the drawings:

Fig. 1 is a vertical section of the upper portion of a window well with the sash channel equipped with my improved weather sealing strips.

Fig. 2 is a fragmentary perspective view of the sash channel.

Fig. 3 is a fragmentary perspective of the web of rubber.

With the advent of the so-called straight run window for automobile bodies, various forms of weather sealing devices have been suggested and used, but so far as I am aware no one has used a construction which is as simple and cheap to manufacture and install as the one which I have designed.

In place of the usual cushion in the sash channel, which is ordinarily of cork or spring metal strip, I employ the rubber strip $a$ which comes as a flat strip of rubber as is shown in Fig. 3. This is obviously relatively cheap to manufacture compared with some of the molded strips which are used in weather sealing devices.

This rubber strip is of the proper width so it can be folded up as shown in Fig. 1 and wrapped around the edge of the glass within the sash channel $b$. A Z-section metal strip $c$ is provided and is hooked under the bottom edge of the glass and as the glass does not come clear down to the bottom of the channel, the weight of the glass rests on the upper flange $e$ of the Z section. This serves to turn out the weather flap $d$ and hold it out straight. This weather flap wipes the sill member $f$ of the window well and constitutes the weather seal.

This sash channel can be perfectly plain, although it here happens to be shown with a subtended channel portion $g$ which is for the purpose of receiving the roller on the lever arm of the particular type of window regulator that I happen to use, but obviously this portion of the channel has nothing to do with the invention.

What I claim is:

1. A sash, comprising a sliding glass panel, a piece of sheet rubber stock enfolding the bottom edge of the panel, a metal channel arranged to receive a portion of said stock and the glass panel, a portion of the rubber stock extending outwardly beyond the sash as a weather sealing flap for engagement with the window well.

2. A sash, comprising a metal channel, a glass panel, a flexible strip enfolding the bottom edge of the panel and located within the channel and having an outwardly extending portion and a metal strip engaged under the bottom edge of the panel and also engaging the rubber strip for holding a portion of said strip projecting outwardly as a weather flap.

3. A sash, comprising a metal channel member, a glass panel seated therein, a weather strip of flexible material enfolding the bottom edge of the glass panel and having an outwardly projecting portion and a Z-section strip of stiff material engaging under the lower edge of the panel and having the upper bar of the Z engaging the weather strip and holding same in projected position.

In testimony whereof I have affixed my signature.

EMORY GLENN SIMPSON.